US007020159B1

(12) United States Patent
Peshkin et al.

(10) Patent No.: US 7,020,159 B1
(45) Date of Patent: Mar. 28, 2006

(54) AUTO DETECTION METHOD AND SYSTEM FOR MATCHING A COMMUNICATION PROTOCOL OF A CALLING MODEM WITH A COMMUNICATION PROTOCOL OF AN ANSWERING MODEM

(75) Inventors: Joel D. Peshkin, San Juan Capistrano, CA (US); Diep H. Le, Lake Forest, CA (US); Hiep Nguyen, Placentia, CA (US); Simon Zhu, San Jose, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 970 days.

(21) Appl. No.: 10/008,925

(22) Filed: Dec. 6, 2001

(51) Int. Cl.
H04J 3/22 (2006.01)
H04B 1/38 (2006.01)

(52) U.S. Cl. .................................... 370/466; 375/222

(58) Field of Classification Search .................. None
See application file for complete search history.

(56) References Cited

U.S. PATENT DOCUMENTS 5,184,348 A * 2/1993 Abdelmouttalib et al. .. 370/431
5,359,709 A * 10/1994 Blanc et al. ................ 375/222
5,671,251 A * 9/1997 Blackwell et al. .......... 375/222
6,192,055 B1 * 2/2001 Rasanen ..................... 370/465
6,351,470 B1 * 2/2002 Rasanen ..................... 370/465
6,658,026 B1 * 12/2003 Birkeland ................... 370/509

FOREIGN PATENT DOCUMENTS

JP         11017770 A  *  1/1999

OTHER PUBLICATIONS

ITU-T Recommendation V.110, Series V: Data Communications Over the Telephone Network, Oct. 1996, pp. 3-4.*
Jain, V.K. and J.M. Willis, Performance of a Terminal Adapter: CCITT V.110, 1988, IEEE.*
Moughton, J.L., Adapting To the ISDN—Which Rate Adaption Scheme Should I Use?, IEE.*
Simpson, RFC 1662: HDLC-like Framing, Jul. 1994, pp. 11-12.*

* cited by examiner

Primary Examiner—Chi Pham
Assistant Examiner—Jordan Hamann
(74) Attorney, Agent, or Firm—Farjami & Farjami LLP

(57) ABSTRACT

Methods and systems for matching the communication protocol of a calling device with one of a plurality of communication protocols supported by an answering device are provided. Initially, a predetermined amount of data is received and buffered in a memory component. Following, an analysis is performed to match the received data with one of the communication protocols supported by the answering device. Communication protocols that can be detected and matched include, for example, the V.110, V.120 and ISDN protocols. During the buffering and analyzing steps, a predetermined data pattern such as mark idle can be transmitted to the calling device. Thereafter, the answering device is configured to answer the call according to the protocol matched in the analyzing step. A timer can be utilized to limit the period for matching to a predetermined length, after which time the answering device can be configured to answer the call in analog mode.

37 Claims, 7 Drawing Sheets

V.110 Frame structure

| Octet number | Bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

AUTO DETECTION METHOD AND SYSTEM FOR MATCHING A COMMUNICATION PROTOCOL OF A CALLING MODEM WITH A COMMUNICATION PROTOCOL OF AN ANSWERING MODEM

BACKGROUND OF THE INVENTION

1. Field of the Invention

The present invention relates generally to the field of data communication and, more particularly, to connectivity processes for use in communication networks to provide automatic detection of various protocols.

2. Related Art

As the popularity of the Internet continues to grow, more businesses and individuals are making greater use of the many services the Internet provides, for example, e-mail, e-commerce, information searches, and the like. Part of the credit for the rapid growth of the Internet can be attributed to various technological advances that have, for example, increased connection speed, simplified the connection process, etc. Presently, accessing the Internet requires the facilitation of an Internet service provider ("ISP"), which can be defined as an organization that provides its clients access to the Internet. A diverse body of methods, protocols and standards is currently utilized by clients to connect to ISP's. As such, in order to provide its clients with Internet access, an ISP has to be able to detect the many different communication protocols.

An ISP must be able to identify, or detect, the particular connection mode utilized by a client modem attempting to log on to the network. The detection is necessary in order for the client modem to be properly connected at the ISP. More particularly, successful communication between the ISP and the client modem is dependent on the client modem being connected to a central site modem ("CSM") receiving port at the ISP configured to communicate in the same protocol as the protocol utilized by the client modem. Otherwise, communication fails and the connection may be lost if the client modem is connected instead to a port which does not share the client modem's connection mode.

In one conventional method for determining a client modem's specific connection mode, receiving ports at the CSM are pre-configured as either analog or digital. A port in digital mode can be specifically configured as, for example, V.110, V.120, Personal Handyphone Internet Access Forum Standard ("PIAFS") or other Integrated Service Digital Network ("ISDN") protocols known in the art. According to this method, after a port has been configured in a specific mode, it cannot accept other types of incoming calls. Thus, a port configured as V.110, for example, would not be able to communicate with a client modem utilizing the V.120 protocol. Once it has been configured, the port is assigned a specific telephone number, and thereafter, any client modem calling the number assigned to that port is assumed to be attempting to set up a connection under the receiving port's configured mode. Consequently, a connection will not be established if the connection mode at the client side is different than the port's configuration, e.g., if the client is dialing a "wrong number." Another disadvantage with assigning specific telephone numbers to pre-configured ports is the potential for excessive overhead, since sets of telephone numbers have to be allocated to receiving ports even though not all the ports will be operating all the time. Stated another way, there may be lulls in the utilization of specific modes of connection during which time the telephone numbers committed to the ports configured to communicate in such modes remain idle and are therefore wasted.

Another known method for determining a client modem's specific connection mode relies on the local central office ("CO") transmitting certain information about a call to the ISP. This conventional approach can be implemented in an ISDN architecture, for example, wherein the CO provides the ISP with an ISDN setup message during call establishment. For example, as part of the setup message, the CO can inform the ISP of the particular number dialed by the client modem as well as the connection's bearer capability, which is an ISDN layer 3 service indication that defines the characteristics of a given call. The ISP can use this information to determine the client modem's connection mode. The ISP can then configure the receiving port as a specified mode suitable for communicating with the client modem, based on the information provided by the CO. This approach, however, is necessarily limited by the capabilities of the network and cannot work properly, for example, if no setup message is available.

An alternative method for determining a client modem's connection mode permits a coarse distinction between only ISDN/High-level Data Link Control ("HDLC") calls and analog calls. According to this method, the receiving port answers the incoming call in ISDN mode. If continuous HDLC flags are detected within a number of milliseconds of answering the call, the port is configured as 56K ISDN. Otherwise, the port will poll for 64K HDLC flags, and a 64K ISDN connection is established if 64K HDLC flags are detected. If both 56K and 64K speeds fail, i.e. if HDLC flags are not detected for either speed, the port is switched to analog mode. Although this method may be effective for distinguishing between certain digital and analog calls, it lacks the capability to discern different digital protocols and their sub-modes. For example, as is known in the art, V.110 is a non-HDLC rate adaptation protocol which enables end-users with relatively low speed devices to use the 64K ISDN network by supporting intermediate transmission rates, including 8K, 16K and 32K. Further, each of the V.110 intermediate rates can support different line speeds. Other non-HDLC digital protocols, such as PIAFS, which can be 56K or 64K, are also not detected by this conventional method.

Thus, there is an intense need in the art for auto detection systems and methods to differentiate between the various protocols and determine the particular protocol of the calling client modem.

SUMMARY OF THE INVENTION

In accordance with the purpose of the present invention as broadly described herein, there is provided methods and systems for auto detecting and for matching the communication protocol of a calling device with one of a plurality of communication protocols supported by an answering device. Communication protocols that can be detected include, for example, the V.110, V.120 and ISDN protocols, such as V.110 8K, V.110 16K, V.110 32K, V.110 64K, V.120 UI Mode, V.120 MultiFrame Mode, ISDN 56K and ISDN 64K. In one aspect, a receiver receives a predetermined amount of data from the calling device. The data, which is indicative of the particular communication protocol of the calling device, can be buffered in a memory component. The amount of received data buffered can be, for example, 240 bytes. Following, an analysis is performed by a processor to match the received data with one of the communication protocols supported by the answering device. In the case of the V.110 protocol, the particular line speed of the call can also be determined by analyzing the data pattern of the buffered data. During the buffering and analyzing steps, a transmitter can be configured to transmit a pre-determined data pattern to the calling device. For example, the pre-determined data pattern can be mark idle. Thereafter, the answering device is configured to answer the call according to the protocol matched in the analyzing step. In one aspect, a timer can be utilized to limit the period for auto detecting and for matching to a pre-determined length, after which time the answering device can be configured to answer the call in analog mode.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional data transmission, encoding, decoding, signaling and signal processing and other functional and technical aspects of the communication system may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
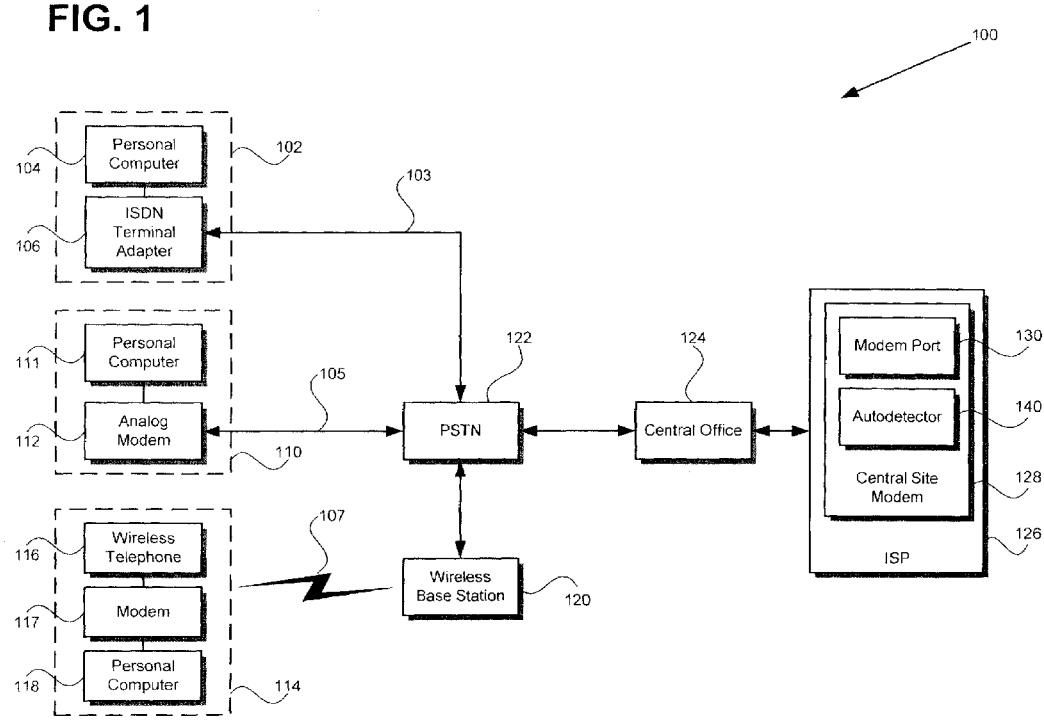
FIG. 1 illustrates a block diagram of a communication system utilizing an auto detector according to one embodiment of the present invention.

FIG. 1 illustrates exemplary communication system 100 according to one embodiment of the invention, in which embodiment central site modem 128 automatically determines, i.e. "auto detects", the specific connection protocol utilized by end-users connecting to Internet service provider ("ISP") 126 and dynamically configures receiving modem port 130 to answer the calls in the correct mode. As shown in FIG. 1, communication system 100 comprises terminal equipment 102, 110 and 114 connected to ISP 126 via public switch telephone network ("PSTN") 122 and central office ("CO") 124. For example, if an end-user originates a call from terminal equipment 102 to ISP 126, the call is routed through PSTN 122 to CO 124, which is a local central office for ISP 126. CO 124 then routes the call to ISP 126, where central site modem 128 can receive and process the call.

Continuing with FIG. 1, terminal equipment 102, 110 and 114 are different exemplary end-user equipment that can be used to connect to ISP 126. Terminal equipment 102 comprises personal computer 104 connected to Integrated Services Digital Network ("ISDN") terminal adapter 106. As is known in the art, ISDN is an international telecommunications standard for providing a digital link from a customer's premises to the dial-up telephone network. Thus, a digital link can be established between terminal equipment 102 and PSTN 122, for example, by connecting ISDN terminal adapter 106 to PSTN 122 via ISDN line 103. ISDN line 103 can be an ISDN basic rate interface ("BRI") connection, for example, providing terminal equipment 102 with two Bearer channels ("B-channels"), each capable of transporting voice, data and video, and each operating at 64 Kbps. It is noted, however, that some networks limit the capabilities of their B-channels to 56 Kbps. ISDN line 103 can further comprise a 16 Kbps Data channel ("D-channel") for signaling purposes.

ISDN terminal adapter 106 can be configured to communicate with ISP 126 using a suitable protocol known to those skilled in the art, including, for example, sync-HDLC or a rate adaptation standard such as V.120 or V.110. Rate adaptation standards V.120 and V.110 are used by ISDN terminal adapters connected to relatively slow speed devices to convert the data from these devices so that the data can be transported over the 64 Kbps ISDN line. Thus, if personal computer 104 is transmitting at a sub-64 Kbps rate, for example, ISDN terminal adapter 106 can modify the data stream coming from personal computer 104 so that it is suitable for transmission over ISDN line 103.

It is known that V.110 is a fixed-frame rate adaptation standard that subdivides the ISDN B-channel capacity so that it can support one lower speed data channel. Under the V.110 rate adaptation protocol, a sub-64 Kbps data stream from personal computer 104, for example, can be converted from an asynchronous signal to a synchronous pattern by the insertion of extra stop bits to put it in time with the synchronous clock. ISDN terminal adapter 106 then converts the speed of transmission up to 64 Kbps in a two step conversion method that involves initially converting the transmission speed to an intermediate rate and then to a final 64 Kbps rate for transmission over ISDN line 103. The V.110 protocol supports transmission speeds ranging from 600 bps to 38,400 bps, while the intermediate rates for V.110 include 8 Kbps, 16 Kbps and 32 Kbps. A frame of V.110 data is made up of 80 bits or 10 bytes, wherein the first byte comprises eight 0-bits, and the subsequent nine bytes begin with a 1-bit. Information pertaining to line speed and clock synchronization is contained in the sixth, or "E", byte of the V.110 frame.

The V.120 rate protocol also supports the conversion of lower transmission speeds for transmission over the ISDN line. But unlike V.110, which subdivides the ISDN B-channel capacity to carry one lower speed data channel, V.120 can support a number of multiplexed low-speed devices over one channel. The V.120 protocol supports a number of transfer modes, including MultiFrame mode and unacknowledged mode. Under MultiFrame mode, acknowledged transfer is achieved by utilization of Information ("I") and acknowledgement frames. MultiFrame mode also provides for error correction and recovery procedures. Additionally, V.120 MultiFrame mode utilizes the exchange of set asynchronous balanced mode extended ("SABME") and Unnumbered Acknowledgement ("UA") frames for link verification purposes. With unacknowledged mode, on the other hand, Unnumbered Information ("UI") frames are utilized, and the link verification procedure is achieved by the exchange of identification ("XID") frames. In either MultiFrame or unacknowledged mode, V.120 uses the High-level Data Link Control ("HDLC") protocol for frame construction. HDLC frames are typically delineated by sequences of bits referred to as "flags" which have a unique 0x7E bit pattern, i.e.—01111110—. In between the flags, an HDLC frame may also have an address field, a control field, information and a frame check sequence.

From the above discussion, it is appreciated that terminal equipment 102 can connect to PSTN 122 by way of ISDN line 103, and thereby to ISP 126, utilizing any of a number of different protocols, depending on the transmission speed of personal computer 104 and/or on the configuration of ISDN terminal adapter 106. For example, terminal equipment 102 can connect to ISP 126 using V.110 at any particular transmission speed and intermediate rate supported by V.110, or using V.120 in either MultiFrame or unacknowledged mode, or using sync-HDLC mode.

Continuing with FIG. 1, exemplary communication system 100 further comprises terminal equipment 110, which includes personal computer 111 connected to analog modem 112. Analog line 105 connects terminal equipment 110 to PSTN 122 and is typically a regular copper wire line providing plain old telephone service. In communication system 100, a call from terminal equipment 110 to ISP 126 is routed by PSTN 122 to CO 124, and from there to ISP 126, where the arriving call can be received and processed by central site modem 128.

Also shown in FIG. 1 is terminal equipment 114 comprising personal computer 118 connected to wireless telephone 116 via modem 117. Wireless telephone 116 is connected to a base station, i.e. base station 120, via wireless link 107 in a manner known in the art. Calls from terminal equipment 114 are routed by base station 120 to PSTN 122, which in turn routes the calls to ISP 126 by way of CO 124. In this manner, terminal equipment 114 can communicate with ISP 126 using a suitable protocol such as V.110 or the Personal Handyphone System Internet Access Forum Standard ("PIAFS"), which is a wireless standard for high-speed data communications by means of the Personal Handyphone System ("PHS"). The PIAFS protocol provides for error correction and retransmission control procedures and supports either 32 Kbps or 64 Kbps Internet access services. Typically, regardless of whether terminal equipment 114 is configured to communicate using the V.110 or PIAFS protocol, wireless telephone 116 would require an adapter, e.g. an ISDN-type adapter for V.110, to convert the data from personal computer 118 into a suitable format for communicating with ISP 126.

Continuing with FIG. 1, calls originating from any of terminal equipment 102, 112 and 114 are routed through PSTN 122 and CO 124 before arriving at ISP 126. As shown, ISP 126 comprises central site modem 128, which includes modem port 130 and auto detector 140. In the present embodiment, calls arriving at ISP 126 are received at modem port 130. Modem port 130 can be a universal port that initially answers the incoming call by receiving raw data in 64K speed. The raw data received by modem port 130 is processed and analyzed by auto detector 140, which, in one embodiment, initiates the buffering of 240 bytes of data when the incoming data stream is determined to be not all mark data (i.e. 0xFF). In some embodiments, auto detector 140 may initiate the buffering of more or less than 240 bytes of data, although it is appreciated that 240 bytes is equivalent to three frames of 8K V.110, which means that even if a frame is seen just before the 80th byte, there would still be enough data buffered to permit thorough analysis.

As will be described in more detail below, auto detector 140 parses the buffered data to establish the mode of connection used by the terminal equipment originating the call. In one embodiment, based on its analysis of the bit pattern of the buffered data and the information extracted from the buffered data, auto detector 140 proceeds to determine the underlying protocol used by the terminal equipment by searching, for example, for particular flag or frame patterns within the buffered data. In one embodiment, auto detector 140 shifts certain bits of the buffered data into registers and analyzes the registered bits to determine the underlying protocol. The underlying protocols can include, for example, V.110, V.120, HDLC or PIAFS. Auto detector 140 can be configured to initiate the buffering of additional data in order to establish the underlying protocol used by the terminal equipment if the initial buffered bytes of data fail to reveal the underlying protocol. Once it has determined the underlying protocol of the incoming call, auto detector 140 parses the data further to confirm its determination and also to establish, if necessary, the particular frame format, subrate and/or transmission speed for the call. Auto detector 140 can then configure modem port 130 to answer the call using the proper protocol. If auto detector 140 is unable to discern a particular protocol after a period of time, auto detector 140 may switch modem port 130 to analog mode.

Figure 2:
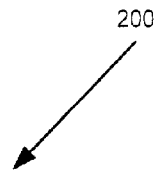
FIG. 2 illustrates the structure of a V.110 frame.

FIG. 2 illustrates the structure of V.110 frame 200. By way of background, a V.110 frame, such as V.110 frame 200, is made up of ten bytes or octets, i.e. octet numbers 0 through 9, each of which has eight bits, i.e. bit numbers 1 through 8. Accordingly, each V.110 frame comprises 80 bits. As shown in FIG. 2, the first octet of V.110 frame 200 comprises all 0-bits, while the first bit of each remaining nine octets is a 1-bit. Other bits in the frame are dedicated for other purposes and may be data-bearing bits. For example, the sixth byte of V.110 frame 200, which is also referred to as the "E" byte, contains data regarding the data rate selection and clock synchronization.

Figure 3:
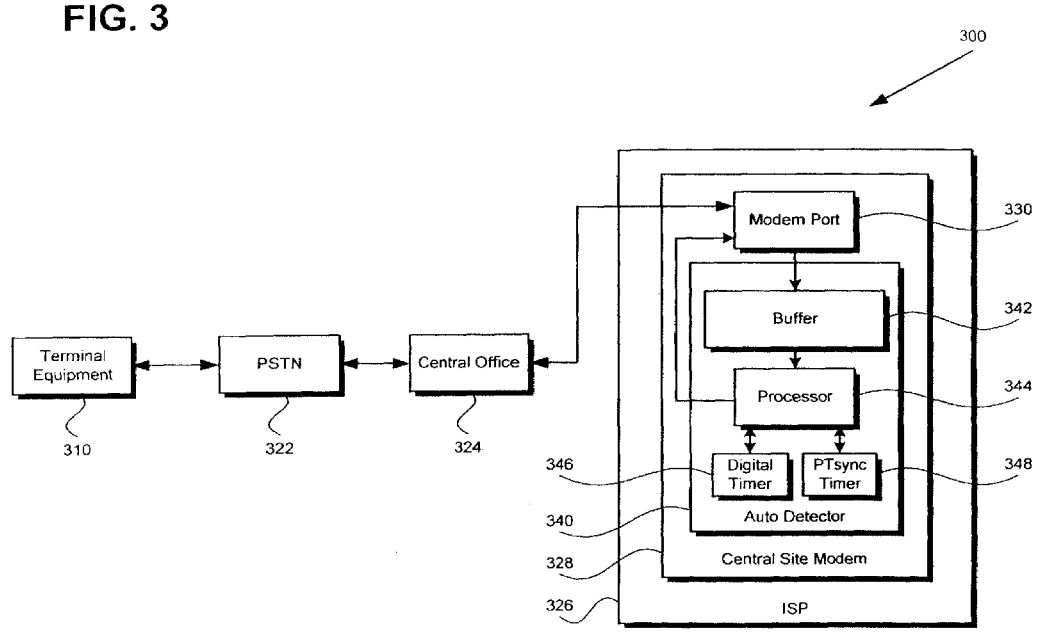
FIG. 3 illustrates a block diagram of a communication system utilizing an auto detector according to one embodiment of the present invention.

Referring now to FIG. 3, exemplary communication system 300 will be used to describe in more detail the operation of an auto detector, such as auto detector 140 in FIG. 1, in auto detecting the protocol used by a terminal equipment calling into an ISP, in accordance with one embodiment. As shown, exemplary communication system 300 comprises terminal equipment 310, PSTN 322, central office 324 and ISP 326. Terminal equipment 310 can be any device or system utilized by an end-user for communicating with ISP 326, including ISDN enabled systems, analog systems and wireless systems. Thus, terminal equipment 310 can correspond, for example, to any of terminal equipment 102, 110 and 114 shown in FIG. 1. Calls originating from terminal equipment 310 to ISP 326 are routed through PSTN 322 and central office 324, which correspond respectively to PSTN 122 and central office 124 in FIG. 1. The calls are then routed to ISP 326.

Continuing with FIG. 3, ISP 326 includes central site modem 328, which comprises modem port 330 and auto detector 340. Calls arriving at ISP 326 from CO 324 can be routed to modem port 330. In the present embodiment, modem port 330 is a universal port which can be configured to answer calls from terminal equipment in any of a number of protocols including, for example, V.110, PIAFS, V.120, sync-HDLC or analog mode. Auto detector 340 comprises buffer 342, processor 344, digital timer 346 and PTsync timer 348.

When a call first arrives at ISP 326, processor 344 configures modem port 330 to receive the incoming raw data in 64K speed. In one embodiment, processor 344 also places modem port 330 in mark idle mode. As a result, central site modem 328 transmits all ones (or 0xFF) to the calling terminal equipment as the auto detection process proceeds. At the same time, processor 344 sets digital timer 346 to expire after a certain length of time. One purpose of digital timer 346 is to limit the auto detection process to a desired time period. Thus, processor 344 can set digital timer 346 to expire after 100 milliseconds, for example, after which time the auto detection process may be halted even if the underlying protocol is not detected. Upon expiration of digital timer 346, modem port 330 may be switched to analog mode.

As the raw data is received by modem port 330, processor 344 analyzes the data stream to determine when data is recovered. Once processor 344 detects non-0xFF data, processor 344 instructs modem port 330 to collect a certain number of bytes of data into buffer 342 for analysis. In one embodiment, the number of bytes buffered is set at 240, which is equivalent to three frames of 8K V.110, meaning that even if a frame is not detected until the 80th byte, there would still be enough buffered data remaining for thorough analysis.

In one embodiment, processor 344 can be configured to search the buffered data for specific bit patterns indicative of V.110. By way of background, it is known in the art that with an 8K connection, only the first bit position of each 8-bit frame or byte of the incoming data stream is significant, i.e. representing actual data, while the remaining seven bit positions are mark idle or binary 1-bits. Thus, effective transmission of a byte or octet of a V.110 frame, for example, would require transmission of eight consecutive 8-bit frames, where each frame comprises a data-carrying bit at the first bit position and mark idle bits at the other seven bit positions. In the case of the first byte of a V.110 frame, which comprises all 0-bits, it would require transmission of eight consecutive 0x7F bytes to effectively transmit the first octet of a V.110 frame. Therefore, a bit pattern having eight consecutive 0x7F frames would indicate V.110 8K. In a similar manner, V.110 16K may be detected when four consecutive 0x3F bytes are found, since each frame of a 16K transmission comprises two significant bits at the first and second bit positions followed by six mark idle bits. V.110 32K is indicated by two consecutive 0x0F bytes, since each V.110 32 K byte comprises four significant bits at the first through fourth bit positions followed by four mark idle bits, and V.110 64K is indicated by a byte of all 0-bits, since every bit position of a 64K connection is significant.

Thus, processor 344 in one embodiment can detect V.110 in the following manner: search for eight consecutive 0x7F bytes to establish underlying protocol to be V.110 8K; search for four consecutive 0x3F bytes to establish underlying protocol to be V.110 16K; search for two consecutive 0x0F bytes to establish underlying protocol to be V.110 32K; and search for one all-zero byte to establish underlying protocol to be V.110 64K.

In some embodiments, rather than searching for particular bit patterns indicative of V.110 in the manner described above, processor 344 can be configured to look at combinations of bits at specific bit positions of the buffered data and to process only those specific bit positions to auto detect for V.110, PIAFS, V.120 and HDLC. In order to achieve this processing, the specific bits can be shifted into registers, for example, or other memory components (not shown) to be analyzed by processor 344. Then by comparing those specific combinations of bits in the manner described below in relation to FIG. 4, processor 344 can auto detect for V.110, PIAFS, V.120 and HDLC.

Figure 4:
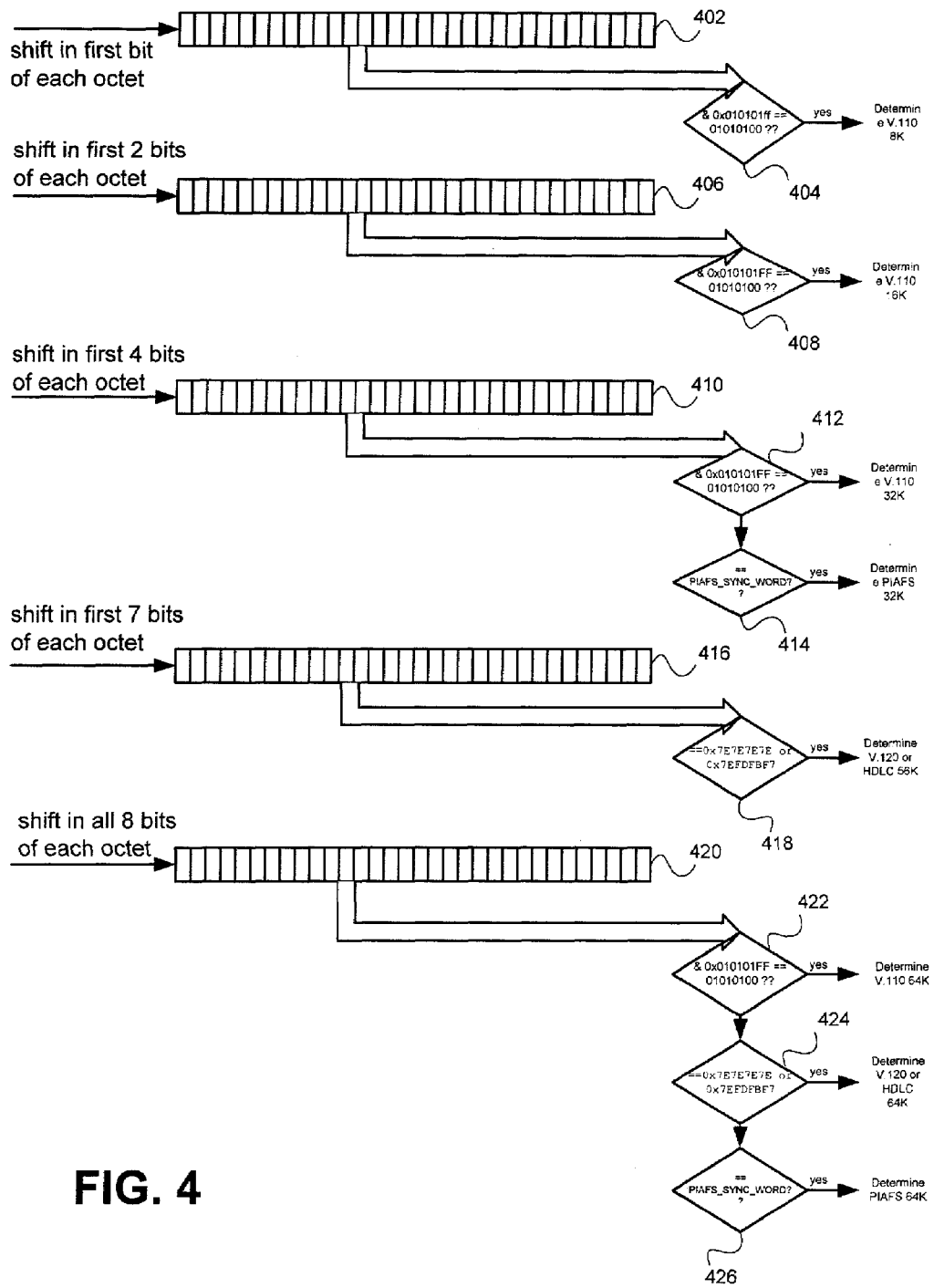
FIG. 4 illustrates a diagram of an auto detection method according to one embodiment of the present invention.

Reference is now made to FIG. 4, which illustrates the processing of particular bits of data at specific bit positions of the buffered data in order to achieve auto detection in accordance with one embodiment. For example, the buffered data can correspond to the data buffered by buffer 342 in FIG. 3, and the processing can be performed by a processor such as processor 344 in FIG. 3.

In FIG. 4, each of registers 402, 406, 410, 416 and 420 comprises a 32-bit shift registers, which can be implemented in hardware or software. It is appreciated, however, that other types of memory components and/or data processing means can be implemented in place of shift registers. For example, in one embodiment, an algorithm may be performed to scan certain bits in the memory, rather than shifting such bits. In the present embodiment, the first bit of each octet of the buffered data is shifted into register 402, the first two bits of each octet are shifted into register 406, the first four bits of each octet are shifted into register 410, the first seven bits of each octet are shifted into register 416 and all eight bits of each octet are shifted into register 420. The shifting of bits into their respective registers may be done simultaneously or sequentially.

Once thirty-two bits have been shifted into a register, the processor can analyze the bit pattern of the register in order to determine the underlying protocol of the incoming call. For example, an AND operation (or mask operation) is performed between the bit pattern of register 402 and a pre-determined bit pattern in decision block 404 to determine whether the underlying protocol is V.110 8K. The pre-determined bit pattern can be, for example, 0x010101 FF (or binary value 00000001000000010000000111111111). If the AND operation yields a pattern matching 0x01010100, then the processor may suspect that the underlying protocol is V.110 8K. It should be noted that, as discussed above, the first octet of V.110 frame 200 comprises eight 0-bits, while the remaining nine octets comprise a 1-bit at the first position. However, if the AND operation does not yield a pattern that matches 0x01010100, then V.110 8K is not suspected.

Referring now to register 406, an analysis similar to the analysis performed on the bit pattern of register 402 for detection of V.110 8K can also be performed on the bit pattern of register 406 for detection of V.110 16K. It is appreciated that the first two bits of each octet of the buffered data are shifted into register 406, because the first two bit positions of each octet of a 16K connection are data-carrying bits. Next, an AND operation is performed on the bit pattern of register 406 using a pre-determined bit pattern, and the resulting pattern is then compared to a test pattern in decision block 408. For example, the predetermined bit pattern to be ANDed with the bit pattern of register 406 can be 0x010101FF, and the test bit pattern can be 0x01010100. The pre-determined bit pattern and the test bit pattern can be selected such that the bit pattern yielded by the AND operation matches the test pattern only if the underlying protocol is V.110 16K. Otherwise, V.110 16K is not suspected.

Referring now to register 410, the bit pattern of register 410 resulting from the shifting in of four bits of each octet of the buffered data can be ANDed with a predetermined bit pattern, and the resulting pattern is then compared to a test bit pattern in order to determine whether the underlying protocol. The pre-determined bit pattern can be, for example, 0x010101FF, and the test bit pattern can be 0x01010100. If the AND operation of decision block 412 yields a bit pattern that matches the test bit pattern, then the processor can determine the underlying protocol of the connection to be V.110 32K. Otherwise, V110 32K is not suspected.

Also, the bit pattern of register 410 is compared with the bit pattern of the PIAFS_SYNC_WORD pattern in decision block 414. The PIAFS_SYNC_WORD is a thirty-two bit sequence that is unique to PIAFS and may therefore be used to detect PIAFS. For example, the PIAFS_SYNC_WORD thirty-two bit sequence may be "01010000111011110010100110010011", which could be expressed as 0x50ef2993 or 0xc994f70a. If the bit pattern of register 410 matches the PIAFS_SYNC_WORD pattern, then the processor can determine the underlying protocol of the connection to be PIAFS 32K. If the bit pattern register 410 does not match the PIAFS_SYNC_WORD pattern, then PIAFS 32K is not suspected.

Now referring to register 416, the bit pattern of register 416 is used to detect V.120 and HDLC 56K. The bit pattern of register 416, which results from shifting in the first seven bits of each byte of the buffered data, can be compared in decision block 418 to specific bit patterns that are indicative of V.120 or HDLC 56K connection. For example, the bit pattern of register 416 can be compared to 0x7E7E7E7E or 0x7EFDBFBF7, and if there is a match between either pattern and the bit pattern of register 416, then the processor can determine the underlying protocol to be V.120 or HDLC 56K. If there is no match, then neither V.120 nor HDLC are suspected.

Referring now to register 420, the bit pattern of register 420 comprises all eight bits of each octet of the buffered data. Thus, register 420 is directed to determining whether the underlying protocol is V.110 64K, V.120 or HDLC 64K, or PIAFS 64K. In decision block 422, the bit pattern of register 420 is ANDed with a pre-determined bit pattern and compared to a test bit pattern. For example, the pre-determined bit pattern can be 0x010101FF, and the test bit pattern can be 0x01010100. If the AND operation yields a bit pattern that matches the test bit pattern, then the processor can determine the underlying protocol of the call to be V.110 64 K. Otherwise, V.110 64K is not suspected.

In decision block 424, the bit pattern of register 420 is compared to specific bit patterns indicative of V.120 or HDLC 64K, which can be 0x7E7E7E7E or 0x7EFDFDBF7, for example. If the bit pattern of register 420 matches either pattern, then the processor can determine the underlying protocol to be V.120 or HDLC 64K. Otherwise, V.120 or HDLC 64 K is not suspected.

The bit pattern of register 420 is also compared to the PIAFS_SYNC_WORD in decision block 426. The processor can determine the underlying protocol to be PIAFS 64K if the bit pattern of register 420 and matches the PIAFS_SYNC_WORD. Otherwise, PIAFS 64K is not suspected.

Continuing with FIG. 4, in one embodiment, if none of the operations of decision blocks 404, 408, 412, 414, 418, 422, 424, and 426 leads to detection of an underlying protocol for the call, then the first bit of the next octet of buffered data is shifted into the respective registers, which shifts out the bit at slot 1 of the registers. The operations of the decision blocks can then be repeated.

Further, the process of shifting in the specified bit(s) and performing the operation set forth in the decision blocks can be repeated, for example, until the underlying protocol to which the register and decision block(s) are directed is detected, until another protocol is detected by other registers and decision blocks, or until a timer, such as digital timer 346 in FIG. 3, expires. In one embodiment the process can be repeated three times in the manner described above, for example, or until the timer expires. Also, if an underlying protocol is detected or suspected, then further processing can be performed to further confirm the determination and also to establish, if necessary, the particular frame format, subrate and/or transmission speed for the call, for example. If an underlying protocol is not detected before the timer expires, the processor may configure the receiving modem port to communicate with the terminal equipment in analog mode. Alternatively, if the search process has been performed three times and an underlying protocol is not detected, the processor may conclude that there is no carrier even if the timer has not expired, and the call may be dropped.

Figure 5A:
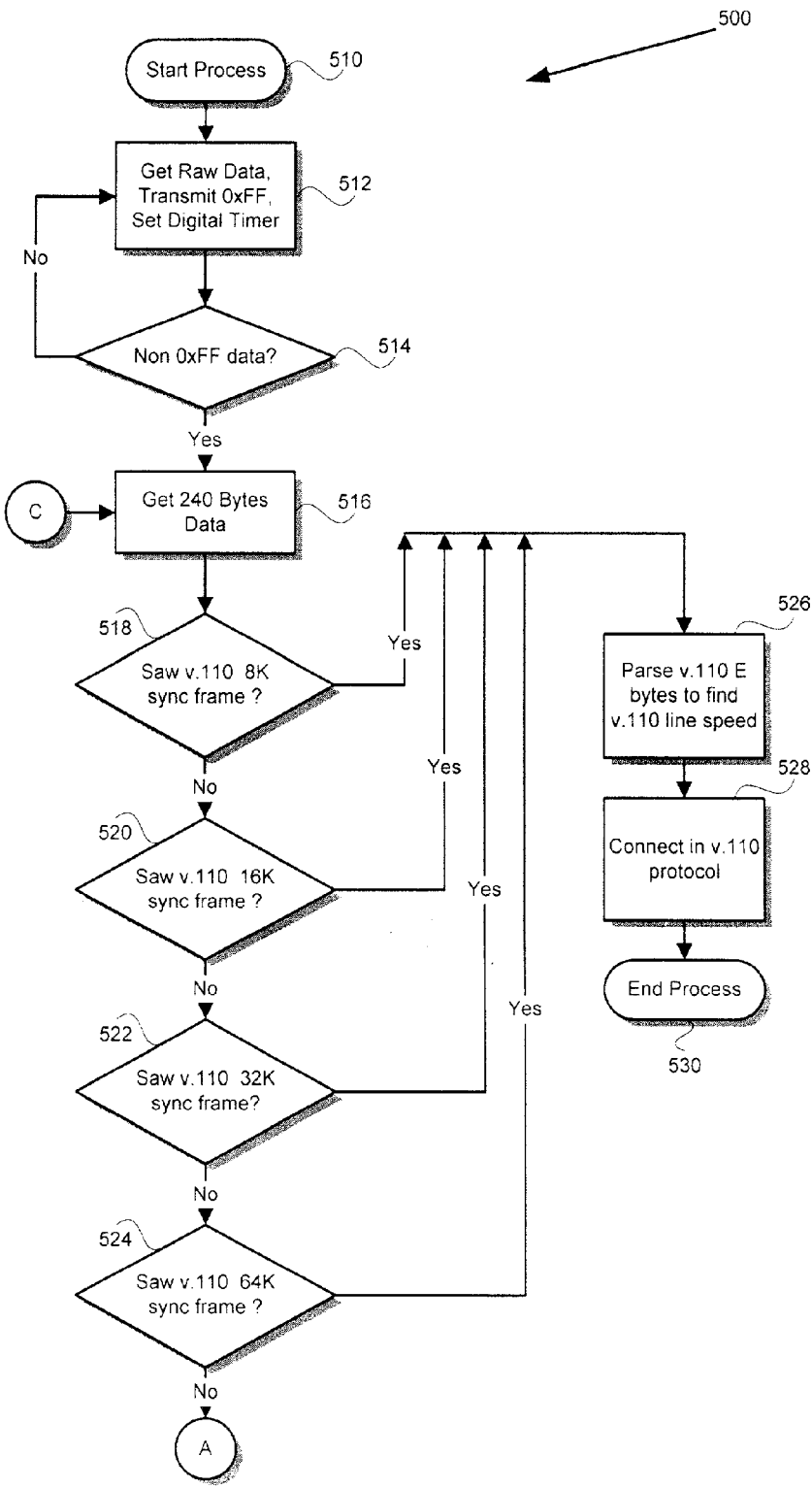
FIGS. 5A, 5B and 5C illustrate a flow diagram of an auto detection method according to one embodiment of the present invention.
Figure 5B:
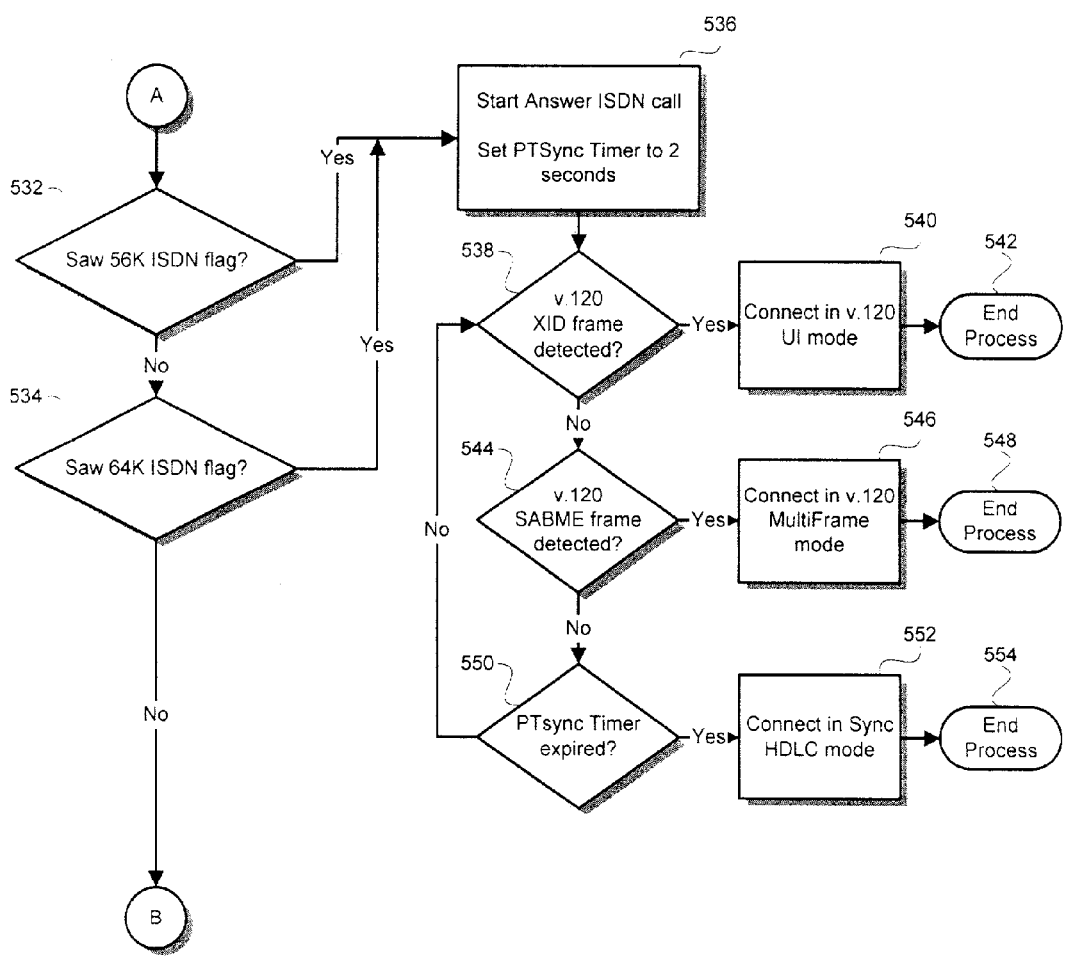
Figure 5C:
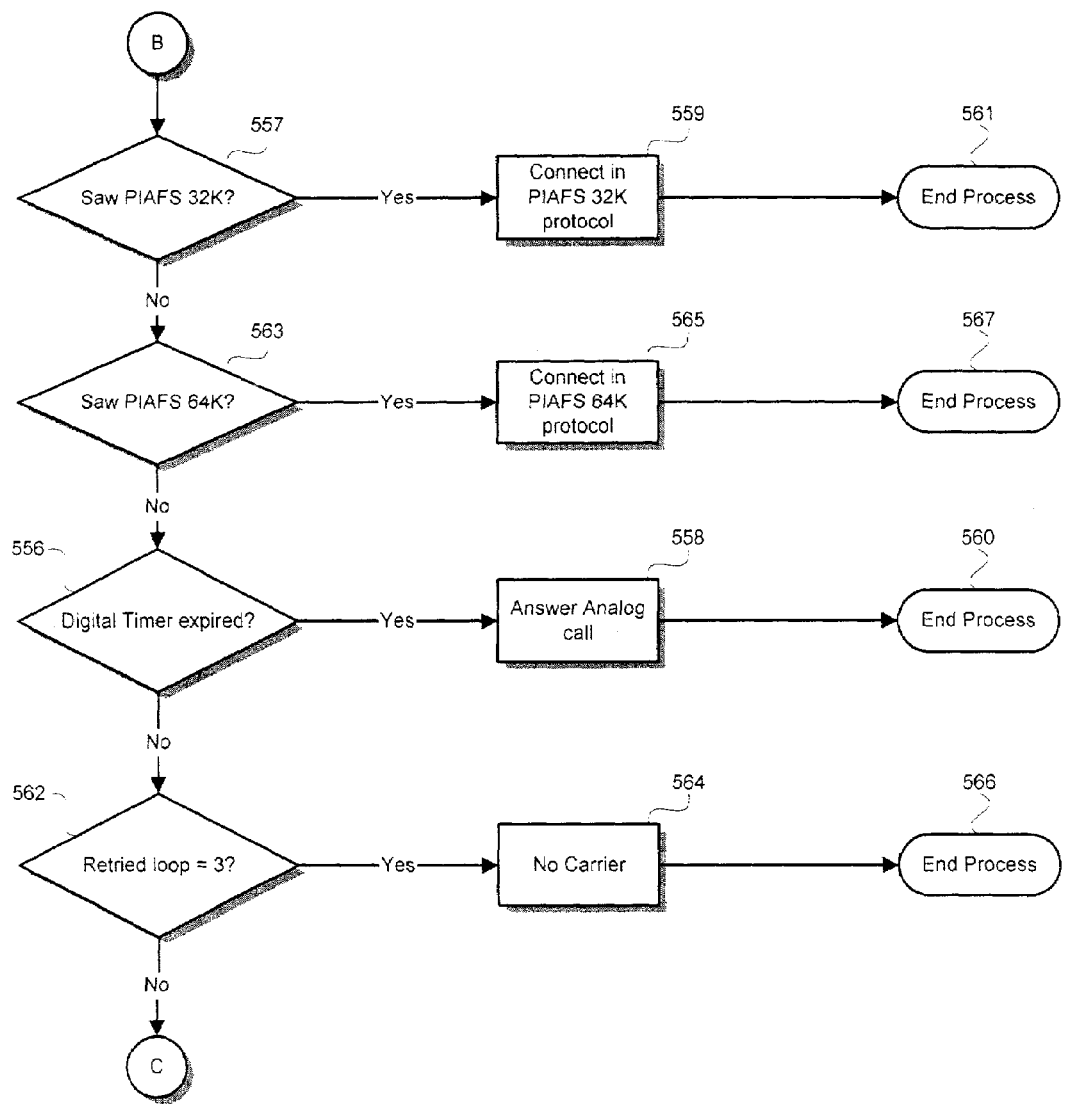

FIGS. 5A, 5B and 5C illustrate a flow diagram of auto detection method 500 according to one embodiment of the present invention. Auto detection method 500 can be performed by a central site modem such as central site modem 328 in FIG. 3, comprising a modem port and an auto detector such as modem port 330 and auto detector 340, respectively. Auto detection method 500 starts at step 510 where a call from a terminal equipment wishing to access an ISP arrives at the ISP having a central site modem, such as central site modem 328. At step 512, the processor instructs a modem port to start receiving the raw data transmitted by the terminal equipment in 64K. In one embodiment, the central site modem transmits mark idle or all 0xFF's to the terminal equipment while the auto detection process proceeds. Also at step 512, the processor sets a digital timer to expire after 100 milliseconds, for example, which will limit the length of time the auto detection process is to be performed.

As the modem port receives the raw data, at step 514, the processor analyzes the data to determine whether there is non-0xFF data being received from the terminal equipment. If the processor does not detect non-0xFF data in the incoming raw data at step 514, then auto detection method 500 returns to step 512 where the modem port can continue to receive additional raw data. The modem port can be configured to receive raw data at 64K until the digital timer expires, or until the processor finds non-0xFF data.

If the processor finds non-0xFF data in the raw data at step 514, auto detection method 500 then proceeds to step 516 where the processor instructs the modem port to buffer a certain number of bytes of data into a buffer in the auto detector. In one embodiment, the modem port buffers 240 bytes, which are equivalent to three frames of 8K V.110 such that even if a frame is not detected until just before the 80th byte, there would still be enough buffered data remaining to ensure that at least another full frame can be found within the buffered data, allowing for accurate analysis and auto detection.

Once the data has been buffered at step 516, auto detection method 500 proceeds to step 518 where the processor analyzes the buffered data to determine whether the terminal equipment is using a V.110 8K sync frame format. As discussed above, in one embodiment, V.110 8K can be detected by discovery of eight consecutive 0x7F bytes. In another embodiment, however, V.110 8K can be detected by analyzing specific bits of the buffered data directed to an 8K connection, ANDing the specified combination of bits with a pre-determined bit pattern, and comparing the bit pattern yielded by the AND operation to a test pattern to determine whether the underlying protocol is V.110 8K (see FIG. 4). If it is determined at step 518 that the terminal equipment is using the V.110 8K, then auto detection method 500 proceeds to step 526. Otherwise, auto detection method 500 continues to step 520 where the processor analyzes the buffered data to determine whether the terminal equipment is using V.110 16K. For example, in one embodiment, the processor can search the buffered data for four consecutive 0x3F bytes to determine the underlying protocol to be V.110 16K. Alternatively, the processor can look at specific bit positions of the buffered data directed to a 16K connection, ANDing the bit pattern resulting from combining those specific bit positions with a predetermined bit pattern, and comparing the bit pattern yielded by the AND operation to a test bit pattern to determine whether the underlying protocol is V.110 16K (see FIG. 4). If the processor determines at step 520 that the terminal equipment is using V.110 16K, then the process proceeds to step 526.

Continuing with auto detection method 500, if the processor determines at step 520 that the terminal equipment is not using V.110 16K, then auto detection method 500 continues to step 522 where the processor searches the buffered data to determine whether the terminal equipment is using V.110 32K. In one embodiment, the processor can determine that the terminal equipment is using the V.110 32K sync frame format if the processor finds two consecutive 0x0F bytes in the data. In another embodiment, detection of V.110 32K may be achieved by looking at specific bit positions of the buffered data directed to a 32K connection, ANDing the bit pattern resulting from extracting those specific bit positions from the buffered data with a predetermined bit pattern, and comparing the bit pattern yielded by the AND operation to a test bit pattern (see FIG. 4). If there is a match between the bit pattern resulting from the AND operation and the test pattern, then the processor can determine the underlying protocol to be V.110 32K. If at step 522 the processor determines that the terminal equipment is using V.110 32K, then auto detection method 500 proceeds to step 526. Otherwise, auto detection method 500 continues to step 524 where the processor analyzes the data to determine whether the terminal equipment is using V.110 64K, which can be established, in one embodiment, by discovery of an all-zero byte. In another embodiment, the processor can analyze the bit pattern produced by shifting of specific bit positions of the buffered data directed to a 64K connection. The pattern can be ANDed with a pre-determined bit pattern, and the pattern yielded by the anding operation can be compared to a test pattern. If a match is found between the pattern yielded by the AND operation and the test pattern, then the processor can determine the underlying protocol to be V.110 64K (see FIG. 4). If the processor determines at step 524 that the terminal equipment is using the V.110 64K sync frame format, then auto detection method 300 proceeds to step 326.

If the processor has determined at any of steps 518, 520, 522 and 524 that the terminal equipment is using one of the V.110 format, then at step 526, the processor searches V.110 frames in the buffered data and parses the sixth or "E" byte of the V.110 frame in order to determine the transmission speed used by the terminal equipment. Next, at step 528, the processor configures the modem port to connect in accordance with the V.110 protocol. Auto detection method 500 then proceeds to, and ends at, step 530.

If the processor, after performing steps 518, 520, 522 and 524, determines that the terminal equipment is not using the V.110 protocol, then auto detection method 500 proceeds to step 532. At step 532, the processor may determine whether the terminal equipment is using a V.120 or HDLC 56K protocol. The processor can look at specific bit positions of the buffered data directed to a 56K connection and compare the bit pattern resulting from extracting those specified bits with a test bit pattern. For example, the test bit pattern can be 56K ISDN flags. If a match is found between the two bit patterns, then the processor can determine at step 532 that the underlying protocol is V.120 or HDLC 56K. In such instance, auto detection method 500 proceeds to step 536. Otherwise, auto detection method 500 continues to step 534.

At step 534, the processor may consider specific bit positions of the buffered data directed to a 64K connection and compare the bit pattern resulting from extracting those specified bits with a test bit pattern. For example, the test bit pattern can be 64K ISDN flags. Based on the comparison of the two bit patterns, the processor can determine the underlying protocol to be V.120 or HDLC 64K if a match is found, in which case auto detection method 500 proceeds to step 536. If the two bit patterns do not match, then auto detection method 500 continues to step 557.

At step 536, which is the step following the detection of V.120 or HDLC at either 56K at step 532 or at 64K at step 534, the processor instructs the modem port to answer the call as ISDN. Also, the processor sets the PTsync timer to, for example, two seconds.

Next, auto detection method 500 continues to step 538 where the processor searches the incoming ISDN data for XID frames, which, as discussed above, would indicate that the terminal equipment is using V.120 UI mode. Thus, if XID frames are detected at step 538, then auto detection method 500 continues to step 540 where the processor configures the modem port to connect with the terminal equipment using V.120 UI mode at either 56K or 64K, depending on the determination at steps 532 and 534. Auto detection method 500 then proceeds to, and ends at, step 542.

If XID frames are not found at step 538, auto detection method 500 continues to step 544 where the processor searches the incoming data for SABME frames. The detection of a SABME frame would indicate that the terminal equipment is using V.120 MultiFrame mode to access the ISP. As a result, auto detection method 500 proceeds to step 546 where the processor configures the modem port to connect with the terminal equipment in V.120 MultiFrame mode at either 56K or 64K, depending on the determination at steps 532 and 534. Auto detection method 500 then proceeds to, and ends at, step 548.

If the processor does not detect SABME frames at step 544, auto detection method 500 proceeds to step 550 where it is determined whether the PTsync timer has expired. If the PTsync timer has expired at step 550, auto detection method 500 continues to step 552 where the modem port is configured to connect in Sync-HDLC mode. Auto detection method 500 then ends at step 554.

If ISDN flags are not detected at either step 532 or step 534, then auto detection method 500 proceeds to step 557 where the processor considers specific bit positions of the buffered data directed to a 32K connection and compares the bit pattern resulting from extracting those specified bits with the PIAFS_SYNC_WORD pattern. If a match is found between the two patterns, then auto detection method 500 proceeds to step 559 where the processor configures the modem port to connect in PIAFS 32K. Next, auto detection proceeds to, and ends at, step 561.

If PIAFS 32K is not detected at step 557, then auto detection 500 continues to step 563 where the processor analyzes the buffered data at specific bit positions directed to a 64K connection and compares the bit pattern resulting from extracting those specified bits with the PIAFS_SYNC_WORD pattern. If a match is found between the two patterns, then auto detection method 500 proceeds to step 565 where the processor configures the modem port to connect in PIAFS 64K. Auto detection method 500 then ends at step 567.

If neither PIAFS 32K nor 64K is detected at either steps 557 or 563, then auto detection method continues to step 556 where it is determined whether the digital timer has expired. It is recalled that the digital timer was originally set at step 512 to limit the duration of the auto detection process. If the digital timer has expired at 556, then auto detection method 500 continues to step 558 where the modem port is switched to analog mode. Auto detection method 500 then ends at step 560.

If the digital timer has not expired at step 556, auto detection method 500 proceeds to step 562. At step 562, it is determined whether the auto detection process has been performed for at least a configurable number of times, which is set at three in the present embodiment. If the auto detection loop has been performed three times, then auto detection method 500 continues to step 564 where the processor concludes that there is no carrier and the call is disconnected. Auto detection method 500 then ends at step 566. On the other hand, if it is determined at step 562 that the loop has not been performed three times, then auto detection method 500 returns to step 516 so that more data can be gathered for further analysis.

Although the steps of auto detection method 500 have been presented in a sequential order, it is appreciated that, in certain embodiments, auto detection for the various communication protocols, including V.110, V.120, HDLC and PIAFS, can be performed in parallel. For example, in such embodiment, the processor can be configured to search the data buffered for each of the communication protocols simultaneously.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An auto detection method for use by an answering device for matching a communication protocol of a calling device with one of a plurality of communication protocols being supported by said answering device, said auto detection method comprising the steps of:

receiving a predetermined amount of received data by said answering device from said calling device, wherein said data are indicative of said communication protocol of said calling device;

analyzing said received data to determine one of said plurality of communication protocols;

transmitting a pre-determined data pattern by said answering device to said calling device during said steps of receiving and analyzing;

running a timer for a pre-determined period during said steps of receiving, analyzing and transmitting; and configuring, said answering device to an analog mode upon expiration of said timer if said analyzing step does not match said received data with one of said plurality of communication protocols.

2. The auto detection method of claim 1, wherein said pre-determined data pattern is mark idle.

3. The auto detection method of claim 1, wherein said one of said plurality of communication protocols is V.110 protocol including a plurality of V.110 data rates, and said analyzing step determines one of said plurality of V.110 data rates.

4. The auto detection method of claim 3, wherein said analyzing step further determines a line speed by reading a byte of said received data.

5. The auto detection method of claim 1, wherein said analyzing step determines that said received data matches an ISDN protocol.

6. The auto detection method of claim 1, wherein said analyzing step determines that said received data matches a V.110 protocol at 8K data rate if eight 0x7F bytes are found in said received data.

7. The auto detection method of claim 1, wherein said analyzing step determines that said received data matches a V.110 protocol at 16K data rate if four 0x3F bytes are found in said received data.

8. The auto detection method of claim 1, wherein said analyzing step determines that said received data matches a V.110 protocol at 32K data rate if two 0x0F bytes are found in said received data.

9. The auto detection method of claim 1, wherein said analyzing step determines that said received data is a V.110 protocol at 8K data rate if a plurality of first bits from each of a plurality of octets of said received data match a predetermined pattern.

10. The auto detection method of claim 1, wherein said analyzing step determines that said received data is a V.110 protocol at 16K data rate if a plurality of first and second bits of each of a plurality of octets of said received data match a predetermined pattern.

11. The auto detection method of claim 1, wherein said analyzing step determines that said received data is a V.110 protocol at 32K data rate if a plurality of first, second, third and fourth bits of each of a plurality of octets of said received data match a predetermined pattern.

12. The auto detection method of claim 1 further comprising the step of configuring said answering device according to said one of said plurality of protocols determined in said analyzing step.

13. The auto detection method of claim 1, wherein said analyzing step analyzes said received data to match said received data with said one of said plurality of communication protocols, including a V.110 protocol, an ISDN protocol and a PIAFS protocol.

14. An auto detector for use by an answering device for matching a communication protocol of a calling device with one of a plurality of communication protocols being supported by said answering device, said auto detector comprising:
- a receiver capable of receiving received data from said calling device;
- a memory capable of buffering a predetermined amount of said received data, wherein said data are indicative of said communication protocol of said calling device;
- a processor capable of analyzing said received data to match said received data with one of said plurality of communication protocols; and
- a transmitter capable of transmitting a pre-determined data pattern by said answering device to said calling device while buffering and analyzing said received data;
- wherein said processor runs a timer for a pre-determined period and configures said answering device to an analog mode upon expiration of said timer if said processor does not match said received data with one of said plurality of communication protocols.

15. The auto detector of claim 14, wherein said predetermined data pattern is mark idle.

16. The auto detector of claim 14, wherein said one of said plurality of communication protocols is V.110 protocol including a plurality of V.110 data rates, and said processor determines one of said plurality of V.110 data rates.

17. The auto detector of claim 16, wherein said processor further determines a line speed by reading a byte of said received data.

18. The auto detector of claim 14, wherein said processor determines that said received data matches an ISDN protocol.

19. The auto detector of claim 14, wherein said processor determines that said received data matches a V.110 protocol at 8K data rate if eight 0x7F bytes are found in said received data.

20. The auto detector of claim 14, wherein said processor determines that said received data matches a V.110 protocol at 16K data rate if four 0x3F bytes are found in said received data.

21. The auto detector of claim 14, wherein said processor determines that said received data matches a V.110 protocol at 32K data rate if two 0x0F bytes are found in said received data.

22. The auto detector of claim 14, wherein said processor determines that said received data is a V.110 protocol at 8K data rate if a plurality of first bits from each of a plurality of octets of said received data match a predetermined pattern.

23. The auto detector of claim 14, wherein said processor determines that said received data is a V.110 protocol at 16K data rate if a plurality of first and second bits of each of a plurality of octets of said received data match a predetermined pattern.

24. The auto detector of claim 14, wherein said processor determines that said received data is a V.110 protocol at 32K data rate if a plurality of first, second, third and fourth bits of each of a plurality of octets of said received data match a predetermined pattern.

25. The auto detector of claim 14, wherein said processor further configures said answering device according to said one of said plurality of protocols.

26. The auto detector of claim 14, wherein said processor analyzes said received data to match said received data with said one of said plurality of communication protocols, including a V.110 protocol, an ISDN protocol and a PIAFS protocol.

27. An auto detection method for use by an answering device for matching a communication protocol of a calling device with one of a plurality of communication protocols being supported by said answering device, said auto detection method comprising the steps of:
- buffering a predetermined amount of received data by said answering device from said calling device, wherein said data are indicative of said communication protocol of said calling device; and
- analyzing said received data to match said received data with one of said plurality of communication protocols, including a V.110 protocol, an ISDN protocol and a PIAFS protocol.

28. The auto detection method of claim 27 further comprising the step of transmitting a pre-determined data pattern by said answering device to said calling device during said steps of buffering and analyzing.

29. The auto detection method of claim 28, wherein said pre-determined data pattern is mark idle.

30. The auto detection method of claim 27, wherein said V.110 protocol includes 8K, 16K, 32K and 64K data rates.

31. An auto detection method for use by an answering device for matching a communication protocol of a calling device with one of a plurality of communication protocols, including a V.110 communication protocols being supported by said answering device, said V.110 communication protocol having an 8K data rate, said auto detection method comprising the steps of:
- buffering a predetermined amount of received data by said answering device from said calling device, wherein said data are indicative of said communication protocol of said calling device;
- extracting a plurality of first-bit positions from each of a plurality of octets of said received data to generate a first bit pattern;
- masking one or more bits of said first bit pattern to generate a second bit pattern;
- comparing said second bit pattern with a predetermined test pattern to determine said 8K data rate;
- running a timer for a pre-determined period while matching said communication protocol of said calling device with said one of said plurality of communication protocols being supported by said answering device; and
- configuring said answering device to an analog mode upon expiration of said timer if said matching step does not match said received data with one of said plurality of communication protocols being supported by said answering device.

32. The auto detection method of claim 31, wherein said V.110 communication protocol further has a 16K data rate, said auto detection method further comprising the steps of:
- extracting a plurality of first-bit and second-bit positions from each of a plurality of octets of said received data to generate a third bit pattern;
- masking one or more bits of said third bit pattern to generate a fourth bit pattern; and
- comparing said fourth bit pattern with said predetermined test pattern to determine said 16K data rate.

33. The auto detection method of claim 31, wherein said V.110 communication protocol further has a 32K data rate, said auto detection method further comprising the steps of:
- extracting a plurality of first-bit, second-bit, third-bit and fourth-bit positions from each of a plurality of octets of said received data to generate a third bit pattern;
- masking one or more bits of said third bit pattern to generate a fourth bit pattern; and comparing said fourth bit pattern with said predetermined test pattern to determine said 32K data rate.

34. The auto detection method of claim 33, wherein said answering device further supports a PIAFS communication protocol further having a 32K data rate, said auto detection method further comprising the step of comparing said fourth bit pattern with a PIAFS SYNC WORD.

35. The auto detection method of claim 31, wherein said extracting step extracts thirty-two first-bit positions of thirty-two octets to generate said first bit pattern, said masking step masks said first bit pattern with 0x010101FF to generate said second bit patter, and said comparing step compares said second bit pattern with 0x01010100.

36. An auto detection method for use by an answering device for matching a communication protocol of a calling device with one of a plurality of communication protocols being supported by said answering device, said auto detection method comprising the steps of:
   receiving a predetermined amount of received data by said answering device from said calling device, wherein said data are indicative of said communication protocol of said calling device;
   analyzing said received data to determine one of said plurality of communication protocols; and
   transmitting a pre-determined data pattern by said answering device to said calling device during said steps of receiving and analyzing;
   wherein said analyzing step analyzes said received data to match said received data with said one of said plurality of communication protocols, including a V.110 protocol, an ISDN protocol and a PIAFS protocol.

37. An auto detector for use by an answering device for matching a communication protocol of a calling device with one of a plurality of communication protocols being supported by said answering device, said auto detector comprising:
   a receiver capable of receiving received data from said calling device;
   a memory capable of buffering a predetermined amount of said received data, wherein said data are indicative of said communication protocol of said calling device;
   a processor capable of analyzing said received data to match said received data with one of said plurality of communication protocols; and
   a transmitter capable of transmitting a predetermined data pattern by said answering device to said calling device while buffering and analyzing said received data;
   wherein said processor is configured to analyze said received data to match said received data with said one of said plurality of communication protocols, including a V.110 protocol, an ISDN protocol and a PIAFS protocol.

* * * * *

UNITED STATES PATENT AND TRADEMARK OFFICE
CERTIFICATE OF CORRECTION

| | | |
|---|---|---|
| PATENT NO. | : 7,020,159 B1 | Page 1 of 1 |
| APPLICATION NO. | : 10/008925 | |
| DATED | : March 28, 2006 | |
| INVENTOR(S) | : Peshkin et al. | |

It is certified that error appears in the above-identified patent and that said Letters Patent is hereby corrected as shown below:

Column 16, line 25, reading "including a V.110 communication protocols being supported" should read --including a V.110 communication protocol, being supported--.

Column 17, line 12, "patter" should be changed to --pattern--.

Signed and Sealed this

Twelfth Day of September, 2006

JON W. DUDAS
*Director of the United States Patent and Trademark Office*